(No Model.) 2 Sheets—Sheet 1.

G. B. WOODRUFF.
PINION CHUCK.

No. 483,195. Patented Sept. 27, 1892.

Witnesses
H. F. Gidding
G. B. Jenkins

Inventor
George B. Woodruff
by Chas. L. Burdett
Attorney (No Model.) 2 Sheets—Sheet 2.

G. B. WOODRUFF.
PINION CHUCK.

No. 483,195. Patented Sept. 27, 1892.

Witnesses
H. A. Giddings
G. B. Jenkins

Inventor
George B. Woodruff
by Chas. L. Burdett
Attorney

UNITED STATES PATENT OFFICE.

GEORGE B. WOODRUFF, OF WINSTED, CONNECTICUT.

PINION-CHUCK.

SPECIFICATION forming part of Letters Patent No. 483,195, dated September 27, 1892.

Application filed January 22, 1892. Serial No. 418,891. (No model.)

*To all whom it may concern:*

Be it known that I, GEORGE B. WOODRUFF, of Winsted, in the county of Litchfield and State of Connecticut, have invented certain new and useful Improvements in Pinions, of which the following is a full, clear, and exact description, whereby any one skilled in the art can make and use the same.

The object of my invention is to provide a device by means of which a pinion-wire may be securely held by simple and positive acting means in proper position to form the holes drilled in the collets for the reception of the wires that form the leaves.

To this end my invention consists in details of the several parts making up a chuck as a whole and in their combination, as more particularly hereinafter described, and pointed out in the claims.

Figure 1:
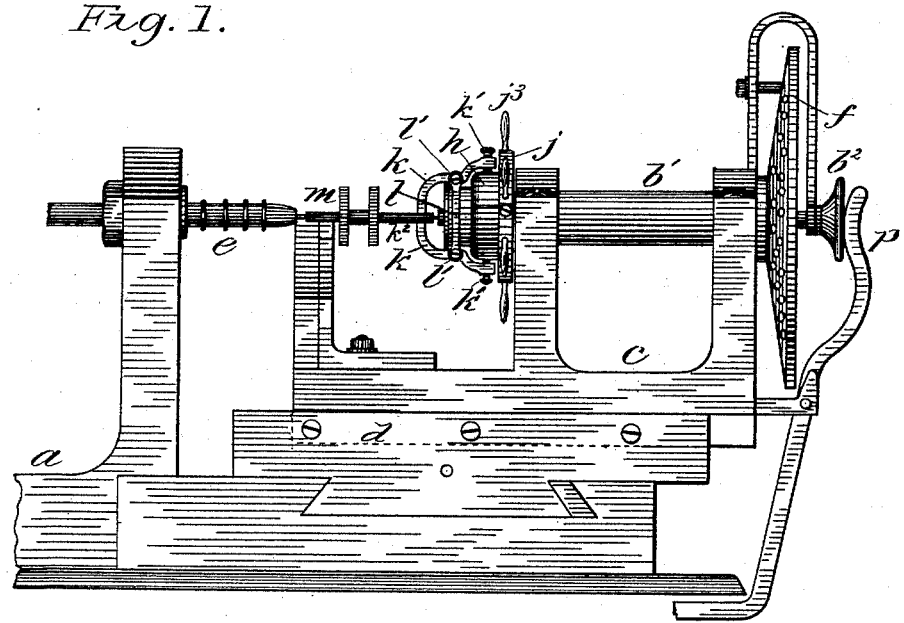
Figure 2:
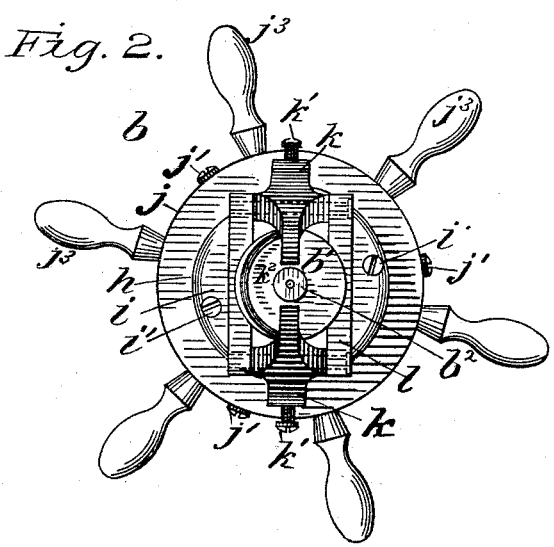
Figure 3:
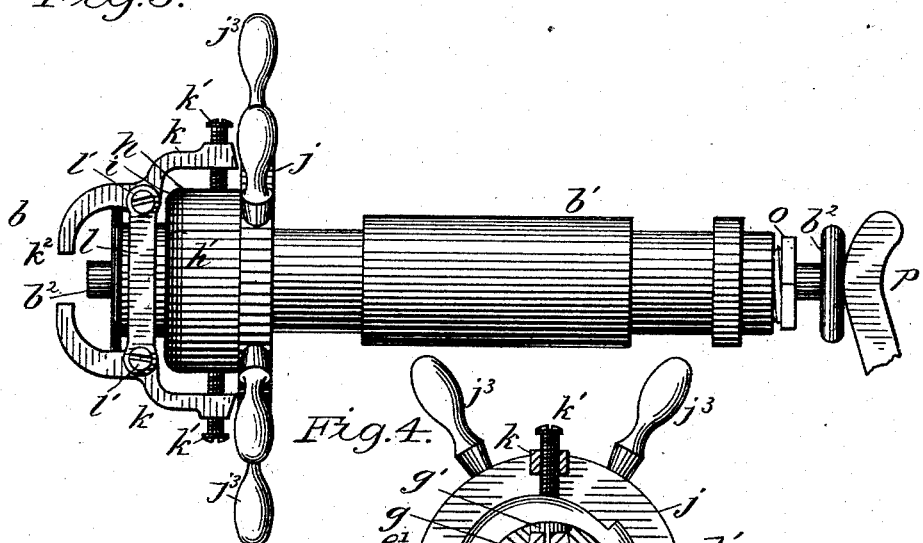
Figure 4:
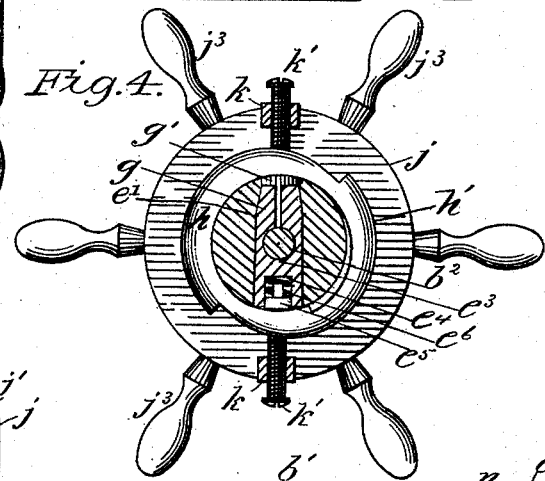
Figure 5:
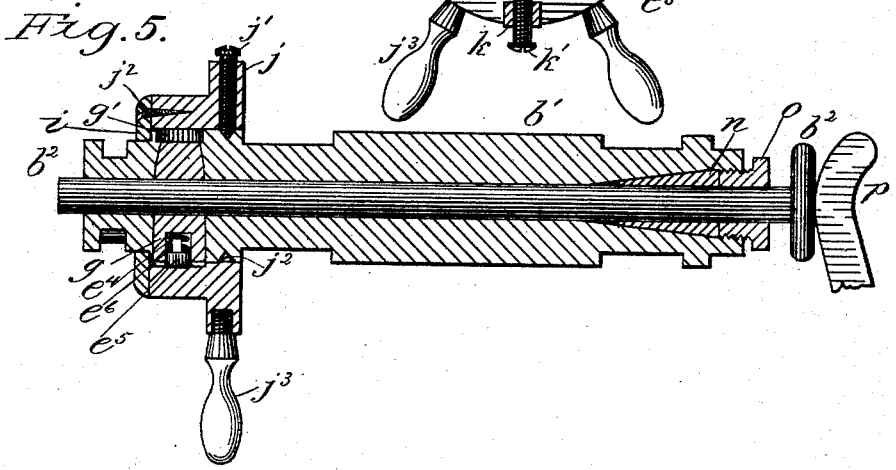

Referring to the drawings, Figure 1 is a detail view, in front elevation, of part of a drilling-machine, showing the chuck and the end of the drill-spindle. Fig. 2 is a detail end view of the chuck on enlarged scale. Fig. 3 is a detail side view of the chuck as removed from the machine. Fig. 4 is a detail view in cross-section through the head of the chuck. Fig. 5 is a detail view, in central lengthwise section, through the chuck-body.

In the accompanying drawings the letter $a$ denotes part of the frame or bed of a pinion-drilling machine, only so much as is directly appurtenant to the pinion-chuck $b$ being shown. This chuck is supported in bearings on the slide $c$, that is supported on a carriage $d$, the whole being provided with the usual means of adjustment in order to correctly locate the chuck with reference to the drill-spindle $e$. To the outer end of the chuck-spindle $b'$ is secured an index-wheel $f$ of ordinary construction, used for the purpose of determining the extent of angular movement of the chuck and of the pinion held in the jaws of the chuck, so that any desired number of holes, evenly divided about the circumference of a collet, may be drilled therein by the machine, the holes in the collets being for the reception of wires that form the lantern-wheel of the lantern-pinion.

The pinion-chuck $b$ is composed of a tubular chuck-spindle $b'$, within which is arranged a slide-rod $b^2$ and the jaw-operating mechanism. In the head or near the front end of the spindle is arranged a slide-clamp $g$, that is located in a socket $g'$, extending transversely through the spindle, one end $e'$ of the clamp being tapered to fit the tapered end of the socket. An oval hole $e^3$ is made in the slide-clamp, and from this hole a slot extends to the tapered end, so as to allow for the compression of the clamp upon the slide that passes through the hole $e^3$. In the end of the slide-clamp opposite the tapered end is a socket $e^4$ for a plug or button $e^5$, and underneath the plug or button is arranged a spring $e^6$, tending to thrust it outward. This arrangement of parts provides a certain elasticity which is necessary to the proper operation of the slide-clamp, the oval opening through the clamp being needed in order to give the clamp movement enough to allow it to be closed or pinched together by the taper on its end. The inner end of the slide-rod bears a suitable socket-piece, into which the end of a pinion may be fitted.

A cam-ring $h$ is arranged upon the head of the chuck and overlies the slide-clamp, the inner surface of the ring being cut to form a species of cam, so that by the rotary movement of the cam-ring upon the chuck-spindle the slide-clamp will be operated. An annular face-plate $i$ is secured to the front end of the cam-ring by screws $i'$, that extend through the cam-ring into sockets in the ring $j$, these three parts forming the casing that practically embraces the slide-clamp. This case is held in position by screws $j'$, that extend radially through the ring and take into a slot $j^2$, formed in the surface of the chuck-spindle. A number of handles $j^3$ are arranged about the periphery of this ring in convenient position to enable the chuck to be rotated. The outer surface of the cam-ring bears a number of cams $h'$, upon which are seated adjustable screws $k'$, that are borne in the ends of the clamping-jaws $k$. In the form of device shown there are two such clamping-jaws that are pivoted to a yoke $l$ with their inner ends bearing the adjustable screws $k'$, the inner ends of which rest upon the surface of the cams $h'$, while the outer ends $k^2$ of these jaws are adapted to securely grasp the outer surface of a pinion $m$. The yoke that supports the jaws $k$ is comprised of side bars that are fitted into grooves near the inner end of the spindle $b'$, these side bars being held against any movement lengthwise of the spindle, but free to move slightly crosswise thereof. The screws $l'$ hold the side bars together, and they also serve as pivots for the jaws $k$ to swing on. The pinion-pivots are often a little out of center and the jaws are hung in this yoke in the manner described, so as to permit of a slight movement to one side so as to conform to the eccentricity of the pinion-wire. Through the sides of the inner ends of the jaws are set-screws adapted to bind upon the adjusting-screws $k'$ after the latter have been arranged, so that the grasping ends of the jaws will properly hold a given size of pinion-wire.

In a tapered socket in the outer end of the chuck-spindle $b'$ there is a packing sleeve or bushing $n$, that is split lengthwise, so as to permit of an opening or closing movement and arranged to have a certain lengthwise play for the purpose of centering the slide. In the outer end of the socket, that is screw-threaded to receive a threaded plug or nut, is arranged a nut $o$, that may be used to cause the sleeve to bind more or less tightly upon the slide in order to compensate for any wear of the parts and to keep it central.

The lever $p$ bears upon the outer end of the slide and it is used to move it forward when the work is put into the machine. A spiral spring may be located around the slide between the shoulder formed by the cap on its outer end and the binding-nut to throw it back when the chuck is opened. The center or fulcrum of this lever $p$ is arranged just below the index-wheel in a bracket or like support fast to the slide that supports the chuck-spindle. The lever may project under the drilling-machine far enough to clear the operator's knees and may be connected by a light rod to a foot-piece, by means of which the slide may be forced up to hold the work until the chuck is closed.

A pinion-blank having been inserted in the chuck, as illustrated in Fig. 1, a turn of the casing by means of the handles turns the cam-ring a sufficient distance to cause the slide-clamp to bind the slide at the same time that the jaws bite upon and hold the pinion-wire, and it only remains to move the drill-spindle forward to drill a hole, and after retracting it turn the pinion-chuck, as by means of the index-wheel, a certain distance to bring a point on the collet into position for drilling another hole, as many holes being drilled as the pinion is to have leaves. The wires are then driven through the holes in the collet and form the teeth of the lantern-pinion.

My improved chuck is evidently usable in connection with other machines than pinion-drill lathes, and my invention is not limited to use in combination with such a machine.

I claim as my invention—

1. In a pinion-drill lathe, in combination, a rotary chuck-spindle supported in bearings, the clamping-jaws supported on a laterally-moving yoke on the head of the chuck, and the cam-ring with its surface in contact with the inner ends of the clamping-jaws, all substantially as described.

2. In a pinion-drill lathe, in combination, the clamping-jaws supported on a laterally-moving yoke, a cam-ring having on its outer surface the jaw-operating cams and on its inner surface the slide-clamp cam, the slide-clamp supported in a socket in the spindle, and the slide movable lengthwise within the spindle, all substantially as described.

3. In a pinion-drill lathe, in combination, a chuck-spindle having a transverse slide-clamp socket near the head of the spindle with a contracted inner end, a yielding plug borne in the head of the slide-clamp, the cam-ring supported on the spindle-head and having a cam on the inner side for operating said clamp, the clamping-jaws, and the surface cams for operating the clamping-jaws, all substantially as described.

4. In a pinion-drill lathe, in combination, the jaw-operating cams, the clamping-jaws with the inner ends in operative contact with the rotary cams, and the laterally-yielding yoke to which said jaws are pivoted, all substantially as described.

5. In a pinion-drill lathe, in combination with a chuck-spindle, a slide supported within said spindle, a slide-clamp supported in a transverse socket in the spindle and having an oval opening through which the slide passes and a tapered end having a tapered socket, a cam-ring arranged upon the spindle with an inner cam in contact with one end of the said slide-clamp, the outer cams in operative contact with the inner ends of the clamping-jaws, and the handles projecting radially from the outer surface of a ring secured to the clamping-ring, and the clamping-jaws pivotally supported upon the spindle-head, all substantially as described.

6. In a pinion-drill lathe, in combination with a rotary chuck-spindle, a slide arranged within the spindle, a tapered split plug arranged within a socket within the end of the chuck-spindle, a nut adapted to seat the plug in the socket, an index-wheel fast to the chuck-spindle, the clamp borne in a transverse socket in the chuck-spindle, the rotary cam-ring arranged upon the chuck-spindle, having an inner cam for operating the slide-clamp and the outer cams for operating the clamping-jaws, the clamping-jaws pivotally supported on a yoke that has lateral play in its supports, and the adjusting-screws passing through the inner ends of the levers and bearing upon the surface of the cams, all substantially as described.

GEORGE B. WOODRUFF.

Witnesses:
JAMES G. WOODRUFF,
S. A. WETMORE.